United States Patent [19]
Inoue

[11] Patent Number: 5,822,622
[45] Date of Patent: Oct. 13, 1998

[54] WATER-PROOF LENS PORT WITH EXTERNALLY OPERABLE RING AND WATER-PROOF CAMERA CASE INCORPORATING SAME

[76] Inventor: Akihide Inoue, 3-9-6 Dai, Kamakura, Kanagawa 247, Japan

[21] Appl. No.: 932,592

[22] Filed: Sep. 17, 1997

[30] Foreign Application Priority Data

Oct. 18, 1996 [JP] Japan .................................. 8-276641

[51] Int. Cl.⁶ .................................................. G03B 17/08
[52] U.S. Cl. ......................................................... 396/27
[58] Field of Search .......................................... 396/25–29

[56] References Cited

U.S. PATENT DOCUMENTS 3,320,018  5/1967  Pepke ......................................... 396/25
5,694,621  12/1997 Dowe et al. ................................ 396/25

Primary Examiner—David M. Gray
Attorney, Agent, or Firm—Keiichi Nishimura

[57] ABSTRACT

A water-proof lens port to be attached to a water-proof camera case for a camera for underwater photography has a cylindrical water-proof main structure for enveloping the lens of the camera, a front window for allowing light from outside to reach the camera lens, an inner magnet ring containing magnets and affixed to the adjusting ring on the lens-barrel of the camera inside so as to rotate together, and an outer magnet ring containing magnets and supported rotatably around the cylindrical main structure. The inner magnet ring and the outer magnet ring are coupled to each other magnetically through a portion of the main structure in between by the force between these magnets contained in the inner and outer magnet rings such that the adjusting ring can be rotated by adjustingly rotating the outer magnet ring outside the main structure of the lens port. Such a lens port is attached to the front part of a camera case covering the main body of the camera. The back part of the camera case may be provided with a pick-up finder which couples with the finder of the camera inside the case.

11 Claims, 7 Drawing Sheets

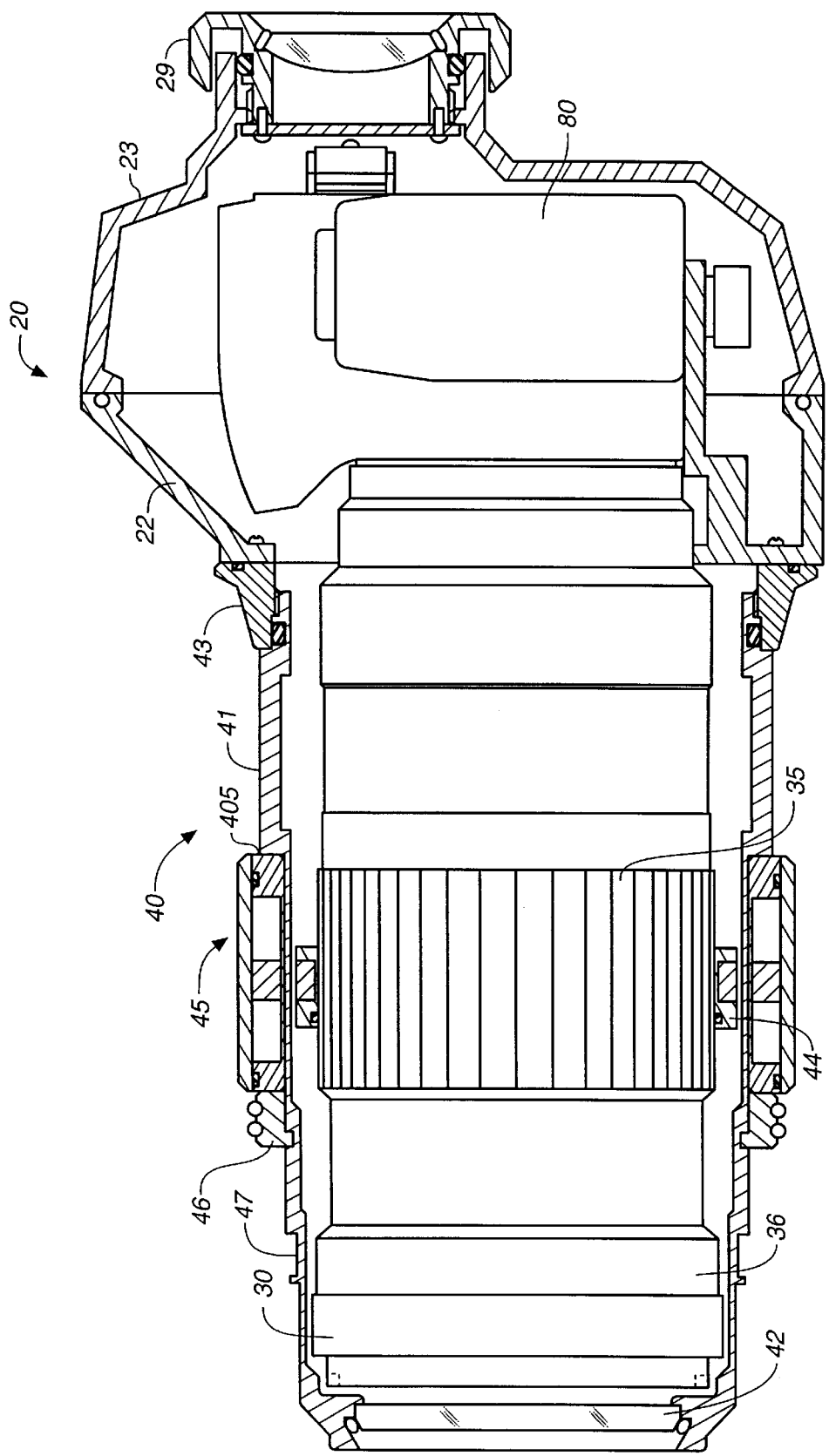
FIG._1

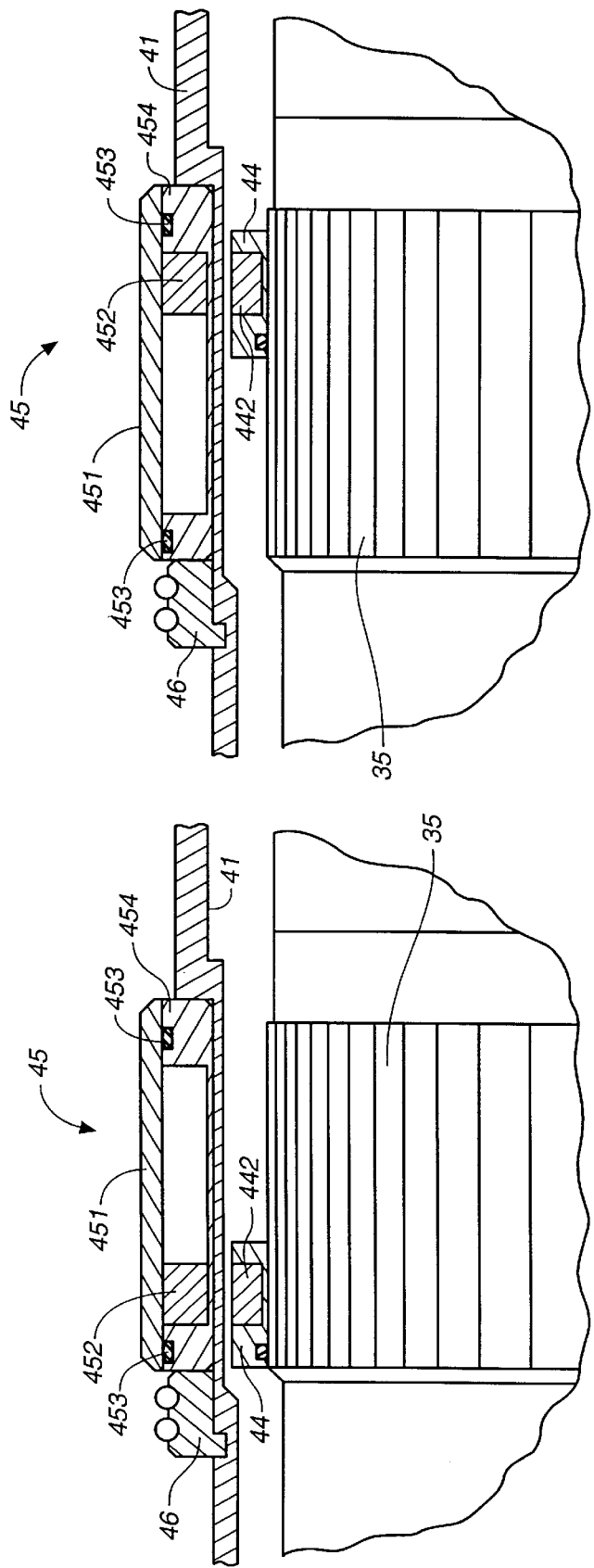

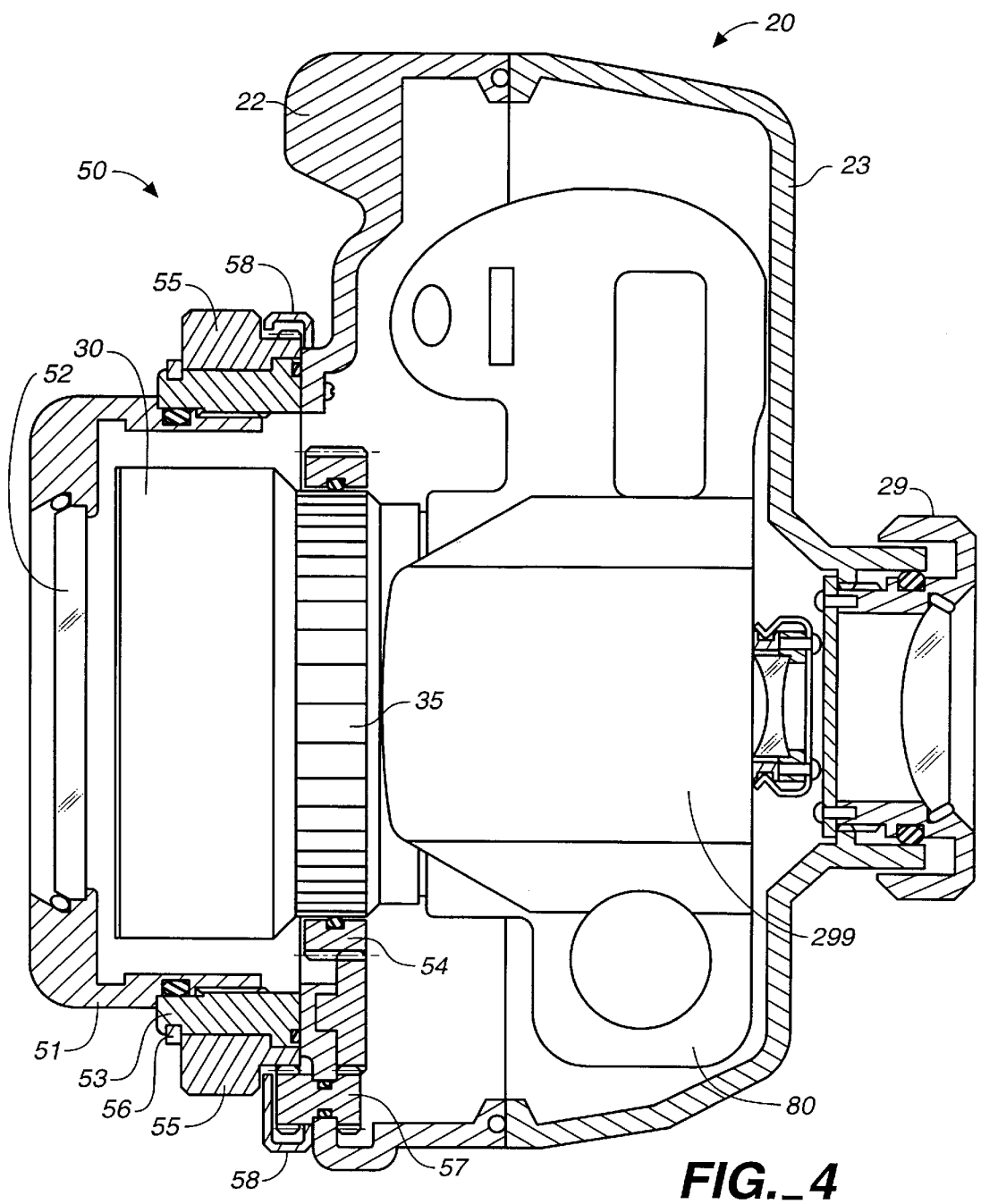
FIG._4

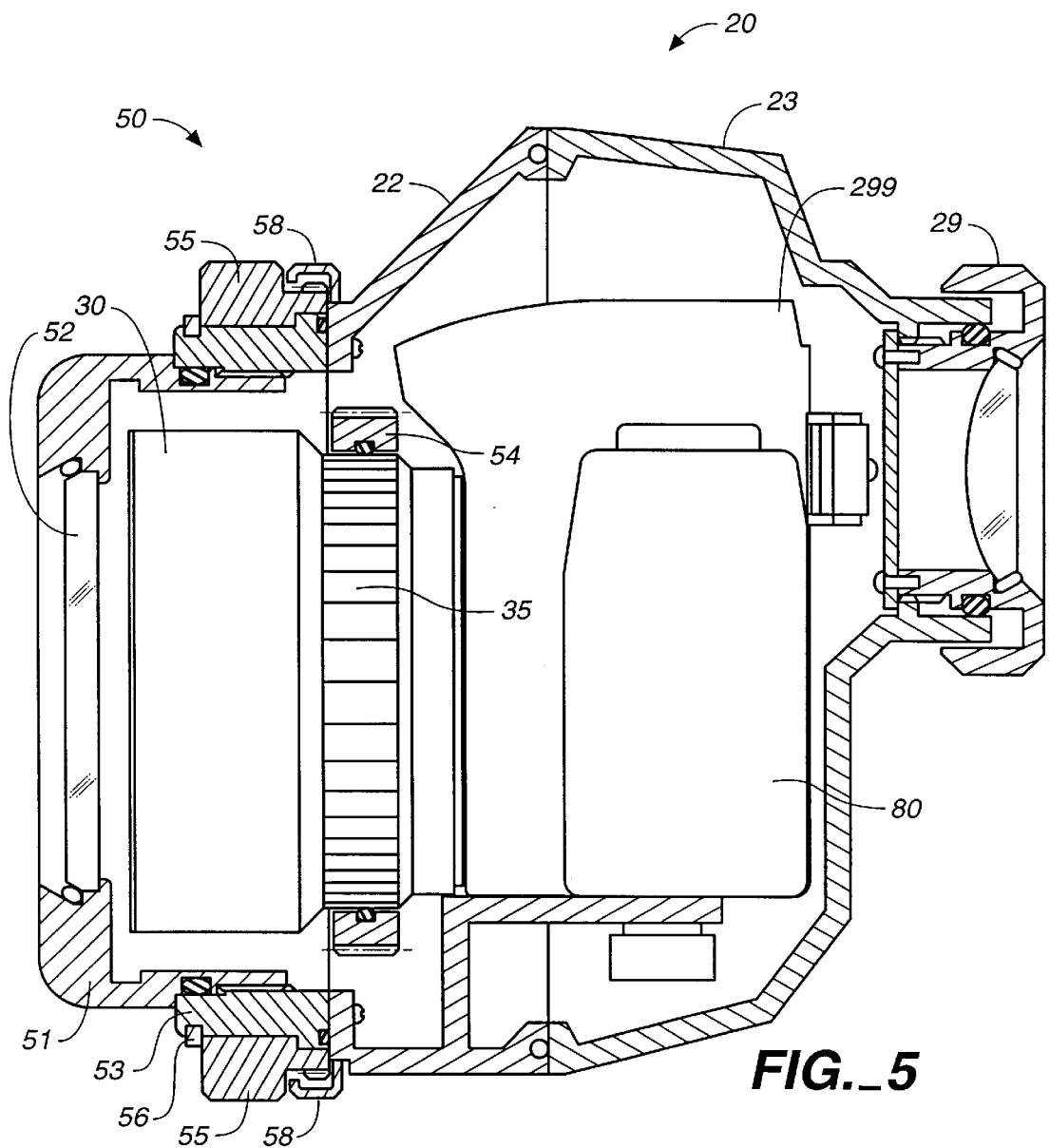
FIG._5

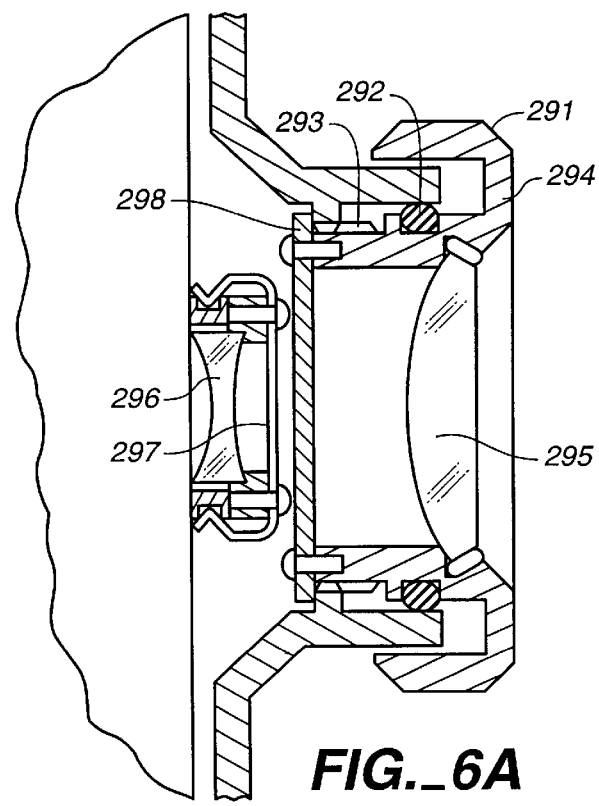
FIG._6A
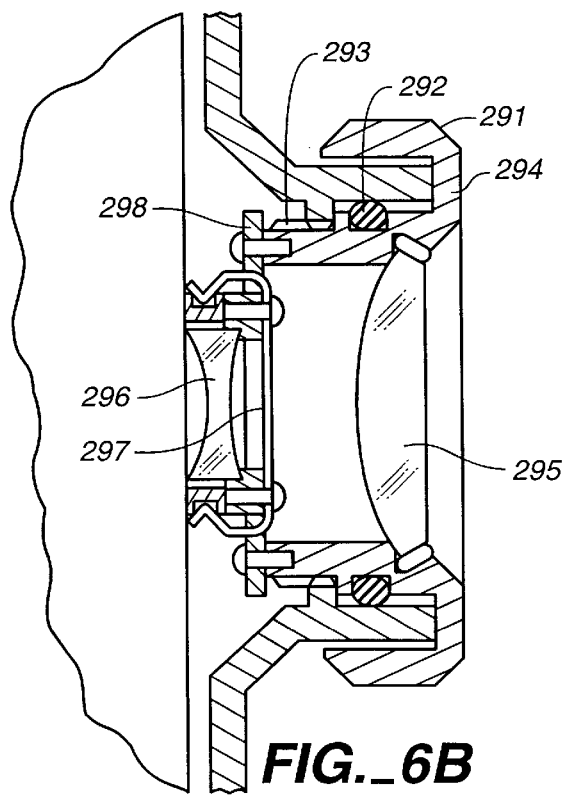
FIG._6B

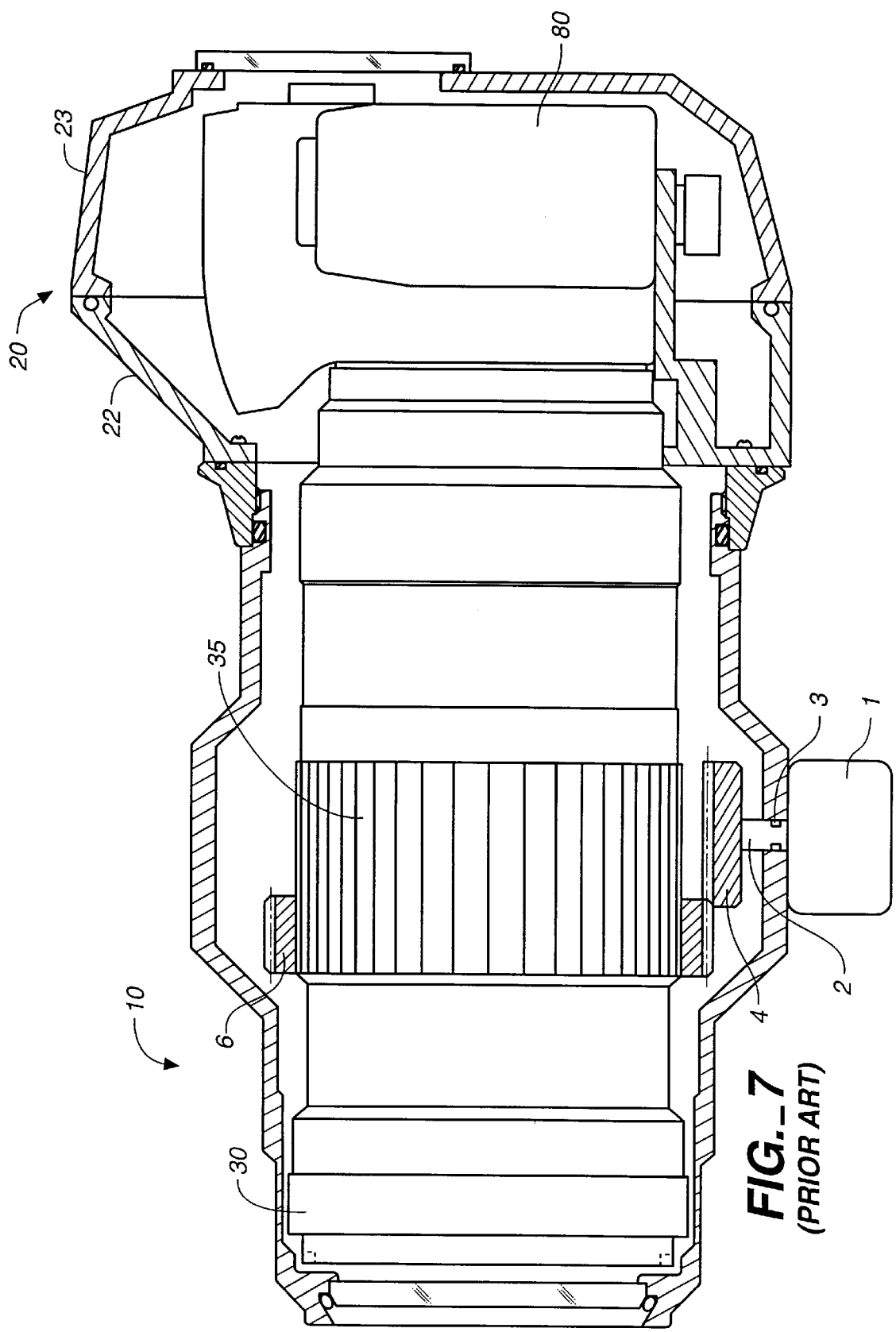
FIG._7 (PRIOR ART)

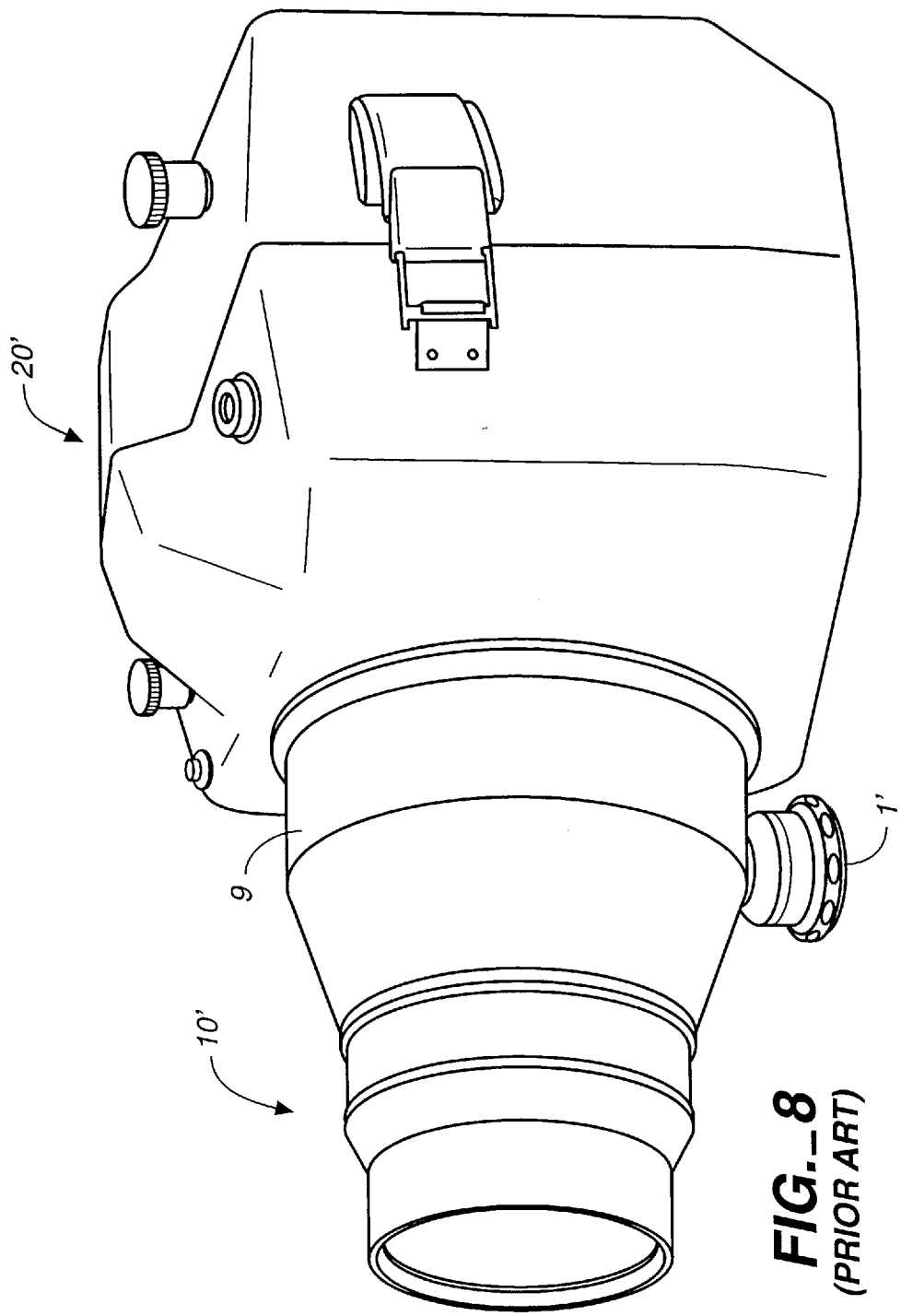
FIG._8
(PRIOR ART)

and the inner magnet ring of the lens port of FIG. 1 taken along line 2B—2B in FIG. 2A;

WATER-PROOF LENS PORT WITH EXTERNALLY OPERABLE RING AND WATER-PROOF CAMERA CASE INCORPORATING SAME

BACKGROUND OF THE INVENTION

This invention relates to a water-proof lens port having an operable lens-adjusting ring on its external peripheral surface, as well as a water-proof camera case incorporating such a port. In particular, this invention relates to such a water-proof lens port which can be handled like an ordinary single-lens reflex camera, being designed like one from the points of view of its overall form, weight balance, the manner of adjusting the camera lens inside, etc., as well as a water-proof camera case incorporating such a port.

When a diver-photographer installs one of a group of exchangeable lenses on a single-lens reflex camera and carries it in a water-proof camera case with a prior art lens port to take underwater pictures, he/she will immediately realize that the lens port is much larger and thicker than the lens carried inside, having a lens-operating knob protruding from its side wall. The total weight of the camera case is significant, and its overall form and weight balance are quite different from those of the camera itself. Since the lens system is operated by means of a protruding knob, furthermore, its operation is quite different from the manner in which an ordinary single-lens reflex camera is operated by holding its tubular lens-barrel while rotating a lens-adjusting ring on its outer circumference.

FIG. 7 shows a prior art water-proof camera case 20 with a prior art lens port 10 for a camera having a lens 30 with a relatively long focal length attached to its main body 80. The lens port 10 may be characterized as having a lens-operating knob 1 with an operating shaft 2 which, extending from the knob 1 and penetrating a water-proof sealed port hole 3, is connected to a crown gear 4 engaging inside the port 10 with a plane gear 6 affixed to the adjusting ring 35 for the camera lens 30. Thus designed, the prior art lens port 10 is significantly larger and thicker than the lens 30 enveloped inside, and the protruding knob 1 is awkward to handle.

FIG. 8 shows another prior art water-proof camera case 20' with another prior art lens port 10' for a camera having a lens with a relatively short focal length attached thereto. Since the adjusting ring for a camera lens with a short focal length is normally positioned near the camera body, a protruding lens-operating knob 1' and an enlarged portion 9 of the port enveloping a crown gear and a plane gear (such as shown at 4 and 6 in FIG. 7) are positioned correspondingly closer to the camera case 20'.

Some prior art water-proof camera cases are formed with the front part made larger, eliminating the enlarged portion shown at 9 in FIG. 8.

All these prior art camera cases are large, difficult to handle, and heavy. Moreover, they are different from ordinary single-lens reflex cameras in the overall shape and the weight distribution. Thus, they do not feel the same as an ordinary single-lens reflex camera when they are carried. In underwater photography, there is usually not enough light, and the automatic focusing mechanism of the camera does not work effectively because of the presence of floating objects such as plankton. This means that manual focusing is more important in underwater photography. Because of changes in the water current, for example, the relative position between the live target object to be photographed and the diver-photographer keeps changing constantly. This means that manual zoom adjustments of the lens, too, must be carried out very frequently and quickly.

In summary, underwater photography requires much labor, efforts and time. Even if a camera which is familiar to the user is used, the probability of obtaining a satisfactory picture is normally disappointingly low even in the case of a skilled diver-photographer.

SUMMARY OF THE INVENTION

It is therefore an object of this invention to eliminate such problems of prior art water-proof lens ports and camera cases by providing an improved water-proof lens port which, when being used, may feel like an ordinary single-lens reflex camera from the points of view of its overall shape and weight balance and can be handled like a single-lens reflex camera.

A water-proof lens port embodying this invention, with which the above and other objects can be accomplished, may be characterized as comprising a cylindrical water-proof main structure containing the lens part of the camera, a front window for allowing light from outside the port to reach the camera lens therethrough, an inner magnet ring containing magnets therein and affixed to the adjusting ring of the camera so as to rotate therewith, and an outer magnet ring containing magnets therein and supported rotatably around the cylindrical main structure. The inner magnet ring and the outer magnet ring are adapted to couple to each other magnetically through a portion of the main structure by the force between these magnets contained in the inner and outer magnet rings such that the adjusting ring of the camera can be rotated by adjustingly rotating the outer magnet ring.

Alternatively, an inner ring gear may be attached to and engaged with the adjusting ring of the camera inside. An outer ring gear is provided so as to be rotatably supported outside the main structure of the lens port and in motion-communicating relationship with the inner ring gear through a linking mechanism such that the adjusting ring of the camera can again be rotated by adjustingly rotating the outer ring gear outside the port.

Such a lens port is attached to the front part of a water-proof camera case. The back part of such a camera case may be provided with a pick-up finder part which optically couples with the finder of the camera and includes a fixed concave objective lens, a convex eye piece and means for adjustingly moving the convex eye piece towards or away from the fixed concave lens such that a suitable diopter correction can be achieved when the camera is used for underwater photography.

With a lens port and camera case according to this invention, a camera, even when used for underwater photography, feels nearly the same as when used above the ground in terms of its weight distribution and its handling such as focusing. Thus, the diver-photographer can pay more attention to the taking of pictures than to the handling of the camera.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional side view of a water-proof camera case with lens port embodying this invention for a camera with a relatively long lens-barrel attached thereto;

FIG. 2A is a plan view and FIG. 2B is a sectional side view of the portion of the outer magnet ring of the lens port shown in FIGS. 2A and 2B when the inner magnet ring is attached at a forwardly displaced position on the adjusting ring of the camera;

FIG. 3A is a plan view and FIG. 3B is a sectional side view of a portion of the outer magnet ring of the lens port shown in FIG. 1 when the inner magnet ring is attached at a backwardly displaced position on the adjusting ring of the camera;

FIG. 4 is a sectional plan view of another water-proof camera case with lens port embodying this invention for a camera with a lens with a relatively short lens-barrel attached thereto;

FIG. 5 is a sectional side view of the camera case of FIG. 4;

FIGS. 6A and 6B are sectional views of the pick-up finder of FIGS. 1, 4 and 5 when the distance between its two lenses is at its maximum and minimum, respectively;

FIG. 7 is a sectional side view of a water-proof camera case with prior art lens port for a camera with a lens with a relatively long focal length; and FIG. 8 is a diagonal external view of another water-proof camera case with prior art lens port for a camera with a lens with a relatively short focal length.

Throughout herein, some like components may be indicated by the same numerals for convenience even where they are components of different products, and repetitive identifications and descriptions will be omitted.

DETAILED DESCRIPTION OF THE INVENTION

FIGS. 1, 2A, 2B, 3A and 3B show a water-proof lens port 40 embodying this invention for a camera with a relatively long lens-barrel supporting a lens 30 and an adjusting ring 35 which is rotatable around its outer surface, characterized as comprising a tubular main structure 41, a water-proof front window 42, a case-attachment part 43, an inner magnet ring 44 affixed to the adjusting ring 35 around the lens-barrel, and an outer magnet ring 45. The main structure 41 is cylindrically shaped, protruding forward from the main body 80 of the camera for containing therein the lens 30 and its lens-barrel. The front window 42 is for allowing image-carrying light from an underwater target object to reach the camera lens 30. The case-attachment part 43 is on the back side of the port 40 to be attached to a front part 22 of the camera case 20. The inner magnet ring 44 is affixed to the adjusting ring 35 around the lens-barrel through elastic deformation.

The outer magnet ring 45 is outside the main body 41, surrounds the inner magnet ring 44 and is magnetically coupled therewith such that the inner magnet ring 44, and hence also the adjusting ring 35 of the camera inside, can be rotated by adjustingly rotating the outer magnet ring 45. For this purpose, the inner magnet ring 44 holds a plurality of strong rare earth metal magnets 442, distributed in the peripheral direction. Similarly, the outer magnet ring 45 comprises water-proofing case ring 454 having compartments 455, a dial ring 451 and several strong rare earth metal magnets 452 arranged in the peripheral direction, contained inside the compartments 455 such that the magnets 442 attached to the inner ring 44 and the magnets 452 on the outer magnet ring 45 couple magnetically across the small gap therebetween provided by a portion of the wall of the main structure 41 of the port 40.

The magnets 442 and 452 inside and outside the main structure 41 must be properly matched longitudinally for establishing a proper coupling between the inner and outer magnet rings 44 and 45. For this reason, the compartments 455 are elongated longitudinally as more clearly shown in FIGS. 2A, 2B, 3A and 3B such that the longitudinal position of the magnet 452 contained therein can be adjusted, according to the longitudinal position of the inner magnet ring 44 attached to the adjusting ring 35 of the camera. Even if the camera is of the type such that the adjusting ring 35 is longitudinally movable, the magnets 452 can be properly centered because they can move correspondingly inside the elongated compartments 455 in the longitudinal direction. FIGS. 2A and 2B show a situation where the inner magnet ring 44 happens to be attached at the farthest forward longitudinal position on the adjusting ring 35, and FIGS. 3A and 3B show another situation where the inner magnet ring 44 happens to be attached at the farthest backward longitudinal position on the adjusting ring 35 with the magnets 452 inside the outer magnet ring 45 positioned accordingly at a forward and backward position, respectively.

With a prior art lens port of the type shown at 10 in FIG. 7, for example, the plane gear 6 had to be set accurately on the adjusting ring 35 in order to be engageable with the crown gear 4 for a proper operation of the camera. According to the present invention, by contrast, the inner and outer magnet rings 44 and 45 can be reliably engaged as long as the magnets 442 on the inner magnet ring 44 are longitudinally positioned within a range of distance comparable to the elongation of the compartments 455, that is, the distance by which the magnets 452 on the outer magnet ring 45 can be moved longitudinally.

The rare earth magnets 452 contained in the compartments 455 are extremely likely to become rusty. In order to prevent water from invading the interior of these compartments 455, O-rings 453 are provided between the outer case ring 454 and the dial ring 451.

The outer magnet ring 45 is inserted around the tubular main structure 41 from its front part where its diameter is smaller and is pushed backward against a step 405 formed on the exterior of the main structure 41. In order to prevent the outer magnet ring 45 from sliding forward, a stopper 46 is inserted around the main structure 41 in front of the outer magnet ring 45. The stopper 46 may comprise rings adapted to be engaged with a groove formed on the outer surface of the main structure 41 or a integrally formed C-shaped elastic ring engageable in such a groove.

If the lens to be enveloped inside is a single-focus lens (say, of focal length 50 mm), its adjusting ring is used for the manual focusing. If the camera inside is an auto-focusing zoom lens (say, of focal length 35–70 mm), it is used for manual zooming. FIG. 1 shows a manually-focusing zoom lens having two adjusting rings 35 and 36, the former (35) serving for manual focusing and the latter (36) adapted for use in the manual zoom adjustment. For use with a camera with such a lens, the main structure 41 of the port 40 shown in FIG. 1 is designed such that another magnetically coupling mechanism can be provided at a position (indicated by numeral 47) corresponding to the second adjusting ring 36, such that both adjusting rings 35 and 36 can be operated from outside.

The port 40, thus structured as described above, is attached to the camera case 20 by attaching the case-attachment part 43 on the back side of the port 40 to the front part 22 of the camera case 20 and inserting screws from inside, as shown in FIG. 1.

When a plurality of ports have a common case-attachment part 43, the user may keep the common case-attachment part 43 attached to the front part 22 of the camera case 20 while disengaging the tubular main structure 41 of the port 40 from the case-attachment part 43 to exchange the lens of the camera enveloped inside and attaching the main structure of another port suitable for the newly installed lens. The mechanism for this attachment of the main structure 41 of a port to the case-attachment part 43 may be either a screw type or a bayonet type of a known kind. In order to achieve a secure water-proof connection between them, an O-ring is provided on the surface of contact between the main structure 41 and the case-attachment part 43.

FIGS. 4 and 5 show another water-proof lens port 50 embodying this invention, adapted to envelop a camera having attached thereto a relatively short lens-barrel supporting a lens 30 and an adjusting ring 35 attached to the lens-barrel of the lens 30 and disposed near where the lens-barrel for the lens 30 is connected to the main body 80 of the camera. This lens port 50 comprises not only a tubular main structure 51 which is generally cylindrically shaped for enveloping the lens 30 therein, a water-proof front window 52, and a case-attachment part 53, but also a fixed inner ring gear 54, an outer ring gear 55 and a link mechanism connecting the inner and outer ring gears 54 and 55. The front window 52 is again for allowing image-carrying light from an underwater target object to reach the camera lens 30. The case-attachment part 53 is on the back side of the port 50 and is adapted to be connected to a front part 22 of the camera case 20. The inner ring gear 54 is attached by elastic deformation to the adjusting ring 35 of the camera contained inside. The outer ring gear 55 is outside and rotatably mounted around the tubular main structure 51 of the lens port 50, and the link mechanism, including an intermediate gear 57 which penetrates the camera case 20, serves to connect the inner and outer ring gears 54 and 55 such that they are in a rotary motion-communicating relationship such that the user can reliably rotate the adjusting ring 35 of the camera by turning the outer ring gear 55 outside of the main structure 51.

According to the embodiment of the invention illustrated in FIGS. 4 and 5, the case-attachment part 53 of the port 50 is connected to the main structure 51, and the outer ring gear 55 is supported around its cylindrically shaped exterior. This, however, is not intended to limit the scope of the invention. The outer ring gear 55 may be directly mounted rotatably around the cylindrically formed outer wall of the main structure 51 of the port 50.

As also shown in FIGS. 4 and 5, a stopper 56 is provided to prevent the outer ring gear 55 from sliding off the front end of the port 50. The stopper 56 may comprise a C-shaped elastic body to be inserted in a groove provided on the surface of the case-attachment part 53 to be affixed thereon such that it can be easily removed when disassembling the gear components, say, for cleaning.

In order to provide a compact motion-communicating linking mechanism, the intermediate gear 57 may be replaced by a plurality of small gear systems. According to the embodiment shown in FIGS. 4 and 5, a protective cover 58 is provided for the outer ring gear 55 for its smooth operations.

The port 50 is attached to the camera case 20 by affixing the case-attachment part 53 with a cylindrical outer surface to the inner surface of the front part 22 of the camera case 20 and screwing them together from inside.

If the user has a plurality of ports of different kinds having a common case-attachment part 53, the common case-attachment part 53 may be kept attached to the camera case 20 while disengaging the main structure 51 of the port 50 from the common case-attachment part 53 to make an exchange of not only the lens of the camera enveloped inside but also the port which is suitable for the newly installed lens. The mechanism for this attachment of the main structure 51 of a port to the case-attachment part 53 may be either a screw type or a bayonet type of a known kind.

An interchange is also possible with a port of the kind described above with reference to FIG. 1 if a common screw type of bayonet type attachment mechanism is provided. In such a case, only the fixed inner ring gear 54 must be disengaged. The other gears of the motion-communicating linking system may be kept attached.

In order to make such flexible exchanges feasible, water-proofing O-rings are provided to the case-attachment part 53 both on its surfaces contacting the front part 22 of the camera case 20 and the main structure 51 of the port 50.

In FIGS. 1, 4, 5, 6A and 6B, numeral 29 indicates a pick-up finder part of the camera case 20, optically coupled to the finder of the camera enveloped inside the case 20. The pick-up finder part 29 comprises a concave objective lens 296 which is affixed to a finder section 299 of the camera by means of a plate spring 297 and a convex eye piece 295 supported by a lens barrel 294 which can be moved towards or away from the concave objective lens 296 by the rotation of a dial member 291 to thereby allow the user to better observe the object to be photographed with an improved diopter. In other words, the user, at the time of underwater photography, can rotate the circular dial member 291 to move the lens-barrel 294 backward and/or forward and to thereby vary the distance between the concave objective lens 296 and the convex eye piece 295 while maintaining the water-proofing relationship therebetween by means of a water-proofing O-ring 292 and a screw groove 293. Thus, a diopter correction suitable for underwater photography can be achieved easily. Moreover, the magnification of the finder is not adversely affected and since the eye point is thereby extended, the user can observe an enlarged image of the object to be photographed and better focus the lens.

In FIGS. 6A and 6B, numeral 298 indicates a stopper ring for preventing the lens-barrel 294 from sliding off backward from the back part 23 of the camera case 20.

The invention has been described above by way of only a limited number of examples, but these examples are intended to be illustrative, not as limiting the scope of the invention. Many modifications and variations are possible within the scope of the invention. Although the invention has been described as applied to a single-lens reflex camera, for example, the water-proof ports and camera cases according to this invention can be effectively used for many other kinds of cameras adapted for use with different kinds of lenses which are adjustable by an adjusting ring. With a camera protected according to this invention, the user can use it for underwater photography by operating it as under the normal above-ground condition.

What is claimed is:

1. A water-proof lens port to be attached to a water-proof camera case for containing therein a camera with a camera lens supported by a lens-barrel having an adjusting ring therearound, said lens port comprising:

a cylindrical water-proof main structure containing said camera lens therein and having a front window for allowing light from outside said port to reach said camera lens therethrough;

a case-attachment part connected to said main structure to be attached to said camera case;

an inner magnet ring containing magnets therein and affixed to said adjusting ring so as to rotate together therewith; and an outer magnet ring containing magnets therein and supported rotatably around said cylindrical main structure, wherein said inner magnet ring and said outer magnet ring couple to each other magnetically through a portion of said main structure by the force between said magnets contained in said inner and outer magnet rings such that said adjusting ring can be rotated by adjustingly rotating said outer magnet ring.

2. The water-proof lens port of claim 1 wherein said outer magnet ring has longitudinally elongated water-proof compartments each containing one of said magnets such that said contained magnets can be moved longitudinally according to the longitudinal position of the corresponding one of the magnets on said inner magnet ring.

3. A water-proof lens port to be attached to a water-proof camera case for containing therein a camera with a camera lens and an adjusting ring for adjusting said lens, said lens port comprising:

a cylindrical water-proof main structure containing said camera lens therein and having a front window for allowing light from outside said port to reach said camera lens therethrough;

a case-attachment part connected to said main structure to be attached to said camera case;

an inner ring gear which is attached to and engaged with said adjusting ring of said camera inside said camera case;

an outer ring gear rotatably supported outside said main structure; and a linking mechanism including an intermediate gear which penetrates said camera case for linking said inner ring gear and said outer ring gear in a motion-communicating relationship wherein said adjusting ring can be rotated by adjustingly rotating said outer ring gear ring.

4. A water-proof camera case for containing therein a camera having a camera lens, a finder and an adjusting ring for adjusting said lens, said camera case comprising:

a front part;

a back part behind said front part and connected to said front part, having a pick-up finder part which is optically connected to said finder of said camera; and a lens port which comprises:

a cylindrical water-proof main structure containing said camera lens therein and having a front window for allowing light from outside said port to reach said camera lens therethrough;

a case-attachment part connected to said main structure to be attached to said front part of said case;

an inner motion-communicating means for being affixed to said adjusting ring and rotating together therewith; and an outer motion-communicating means supported rotatably around said cylindrical main structure for adjustingly causing said inner motion-communicating means and therethrough also said adjusting ring to rotate.

5. The camera case of claim 4 wherein said inner motion-communicating means comprises an inner magnet ring containing magnets therein and affixed to said adjusting ring so as to rotate together therewith, wherein said outer motion-communicating means comprises an outer magnet ring containing magnets therein and supported rotatably around said cylindrical main structure, and wherein said inner magnet ring and said outer magnet ring couple to each other magnetically through a portion of said main structure by the force between said magnets contained in said inner and outer magnet rings such that said adjusting ring can be rotated by adjustingly rotating said outer magnet ring.

6. The camera case of claim 5 wherein said outer magnet ring has longitudinally elongated water-proof compartments each containing one of said magnets such that said contained magnets can be moved longitudinally according to the longitudinal position of the corresponding one of the magnets on said inner magnet ring.

7. The camera case of claim 4 wherein said inner motion-communicating means comprises an inner ring gear which is attached to and engaged with said adjusting ring of said camera inside said camera case so as to rotate together therewith; wherein said outer motion-communicating means comprises an outer ring gear rotatably supported outside said main structure; and wherein said front part incorporates a linking mechanism including an intermediate gear which penetrates said front part for linking said inner ring gear and said outer ring gear in a motion-communicating relationship such that said adjusting ring can be rotated by adjustingly rotating said outer ring gear ring.

8. The camera case of claim 4 wherein said pick-up finder part includes:

a fixed concave objective lens;

a convex eye piece; and means for adjustingly moving said convex eye piece towards or away from said fixed concave wherein a suitable vision correction can be achieved when said camera is used for underwater photography.

9. The camera case of claim 5 wherein said pick-up finder part includes:

a fixed concave objective lens;

a convex eye piece; and means for adjustingly moving said convex eye piece towards or away from said fixed concave wherein a suitable vision correction can be achieved when said camera is used for underwater photography.

10. The camera case of claim 6 wherein said pick-up finder part includes:

a fixed concave objective lens;

a convex eye piece; and means for adjustingly moving said convex eye piece towards or away from said fixed concave wherein a suitable vision correction can be achieved when said camera is used for underwater photography.

11. The camera case of claim 7 wherein said pick-up finder part includes:

a fixed concave objective lens;

a convex eye piece; and means for adjustingly moving said convex eye piece towards or away from said fixed concave wherein a suitable vision correction can be achieved when said camera is used for underwater photography.

* * * * *